Figure 1:
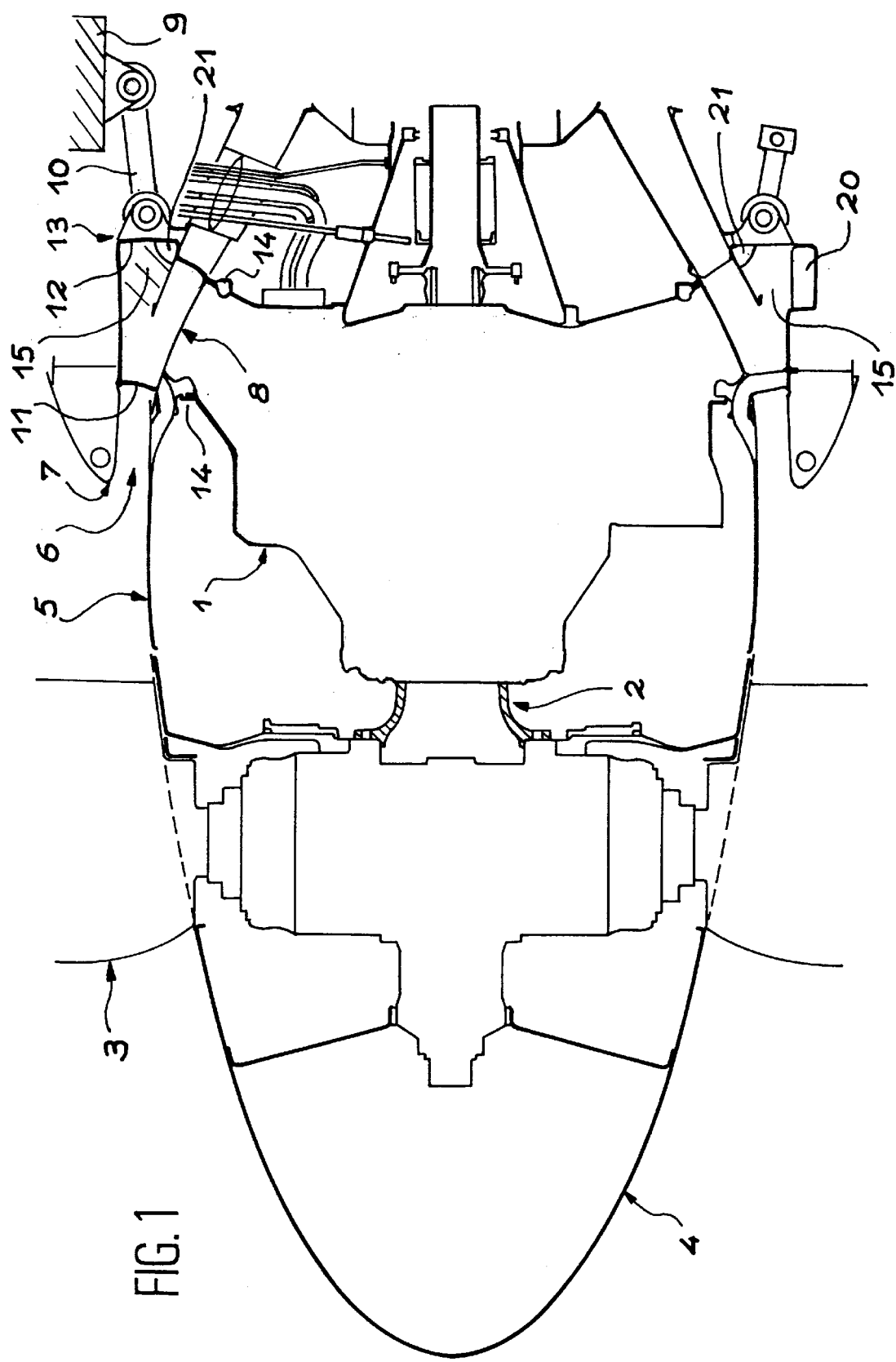

United States Patent

Cousin et al.

[11] Patent Number: 6,129,509
[45] Date of Patent: Oct. 10, 2000

[54] PARTICLE TRAPS FOR TURBO-PROP ENGINE

[75] Inventors: Antoine Emmanuel Cousin, Paris; Georges Mazeaud, Yerres, both of France

[73] Assignee: Societe Nationale d'Etude et de Construction de Moteurs d'Aviation "Snecma", Paris, France

[21] Appl. No.: 09/342,730

[22] Filed: Jun. 29, 1999

[30] Foreign Application Priority Data

Jul. 9, 1998 [FR] France .................................. 98 08800

[51] Int. Cl.[7] ...................................................... F02G 3/00
[52] U.S. Cl. ................................... 415/121.2; 60/39.092; 55/306; 244/53 B; 244/54
[58] Field of Search ............................. 415/121.2, 169.1; 60/39.092; 55/306; 244/53 B, 54

[56] References Cited

U.S. PATENT DOCUMENTS

| 3,534,548 | 10/1970 | Connors | 415/121.2 |
|---|---|---|---|
| 3,673,771 | 7/1972 | Dickey | 415/121.2 |
| 3,832,086 | 8/1974 | Hull, Jr. et al. | 415/121.2 |
| 4,702,071 | 10/1987 | Jenkins et al. | 60/39.092 |
| 4,704,145 | 11/1987 | Norris et al. | 60/39.092 |
| 5,123,240 | 6/1992 | Frost et al. | 60/39.092 |
| 5,253,472 | 10/1993 | Dev | 60/39.75 |

*Primary Examiner*—Christopher Verdier
*Attorney, Agent, or Firm*—Oblon, Spivak, McClelland, Maier & Neustadt, P.C.

[57] ABSTRACT

The particle trap (15) that extends behind an elbow in the air flow stream (6) in a turbo-prop engine is delimited at the back by an end plate (12) to which intake housing suspension rods (10) supporting the front of the rotating shaft (2), are fastened. It is divided by suspension arms (11) which may be drilled (21) to restore the continuity of the annular chamber forming the trap. Therefore the intake housing suspension device extends through the trap. This type of trap makes use of the inertia of solid bodies carried by the air drawn in, and which could damage the engine blades, and to collect them.

4 Claims, 3 Drawing Sheets

PARTICLE TRAPS FOR TURBO-PROP ENGINE

DESCRIPTION

This invention relates to a particle trap for a turbo-prop engine.

Static particle traps are built in a wide variety of ways, but they all operate making use of the inertia of particles transported by air entering the turbo-prop engine. These particles need to be diverted before they reach the compressors, since they could damage the compressor blades; a change is imposed on the direction of the stream in front of the entry to the trap, and particles continue along their original direction and enter the trap, coming out of the deviated flow.

The purpose of the invention is to place the trap in a favorable location so that it does not significantly increase the outside volume of the element of the turbo-prop engine in which it is fitted and does not apply any excessive constraints on the equipment layout in the engine.

More precisely, the particle trap proposed herein is fitted in the gas generator air intake, comprising a housing supporting a reduction gear driving a rotor supporting the propeller; this housing in which the particle trap is fitted supports suspension devices such as connecting rods, the housing and the propeller support rotor.

This particle trap included in the housing is located in an area that has to resist forces induced by the propeller, the gas generator and the weight of the assembly and to transmit these forces, which is unexpected from an element in the form of a chamber, and therefore essentially hollow and usually delimited by thin walls. On the contrary, known particle traps are normally located in "dead" areas of the engine, in other words they are not subject to large forces, and most of them are located in the stator housing around the flow stream.

The trap proposed here is delimited at the back by a circular end plate onto which connecting means between suspension devices and the surrounding structure are fitted, and this chamber is divided by suspension arms projecting forwards and towards the rotor center line from the end plate. These arms provide the strength of the trap and transmit suspension forces, and do not exist in currently used traps. Finally, it is easy to maintain this type of particle trap; all that is necessary is to drill the outside skin with doors immediately above the suspension arms and in a lower part from which all types of particles that have entered the trap can be emptied from it.

One favorable layout of the invention consists of making a perforation in the suspension arms in the lower part that they occupy in the chamber.

The invention will be described in more detail with respect to the following figures which are attached for illustrative purposes only.

Figure 2:
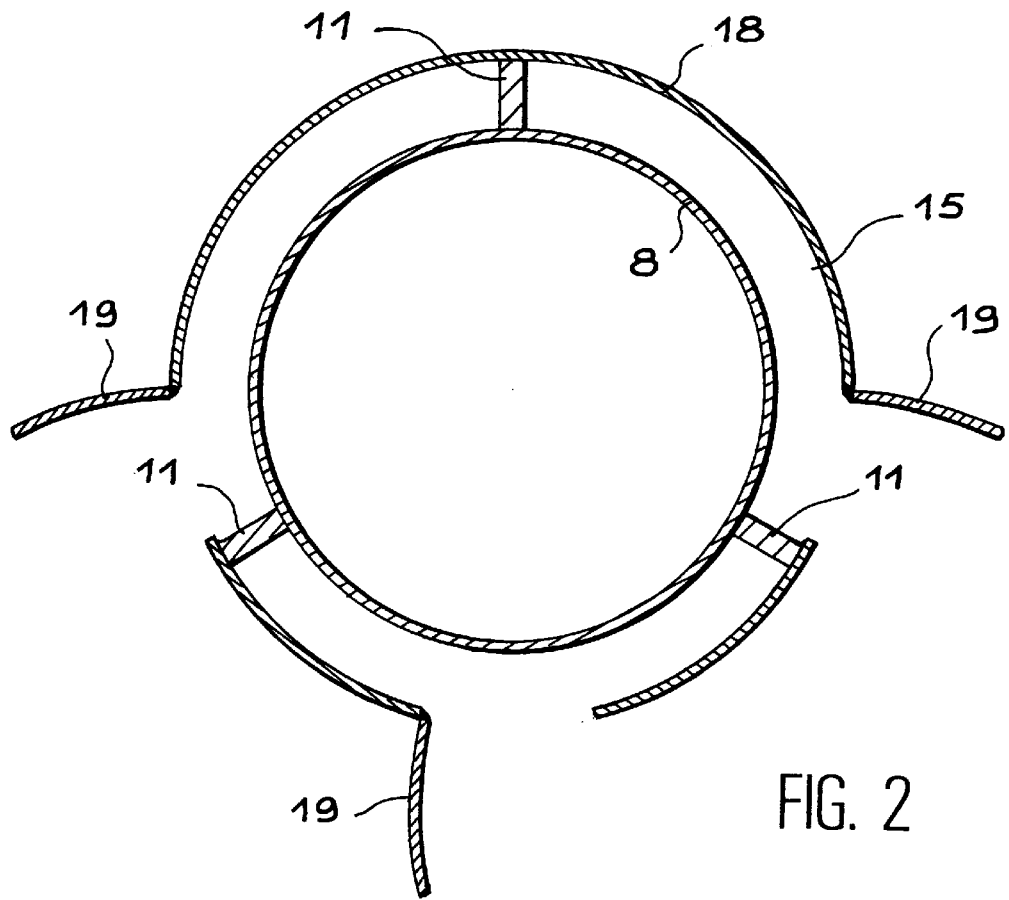
Figure 3:
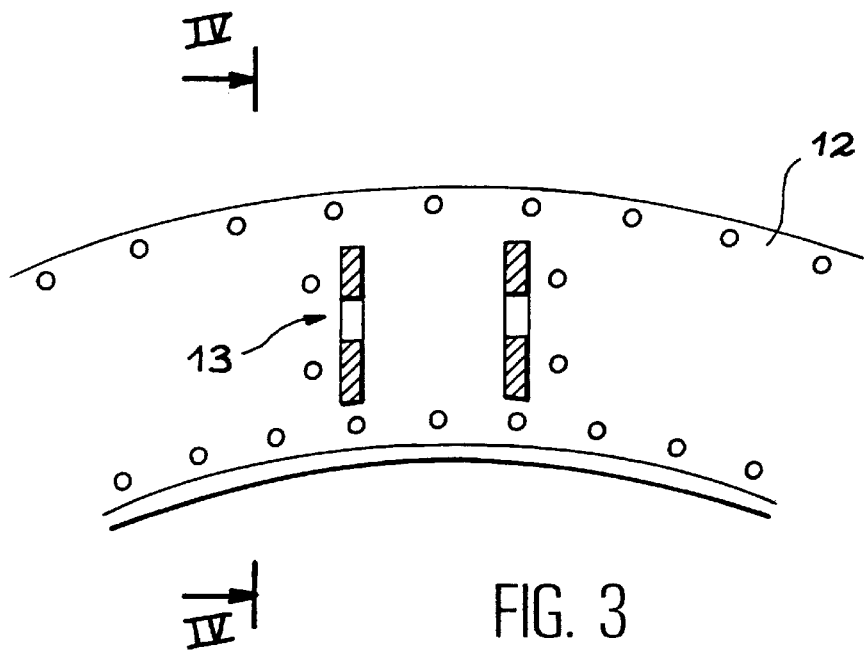
Figure 4:
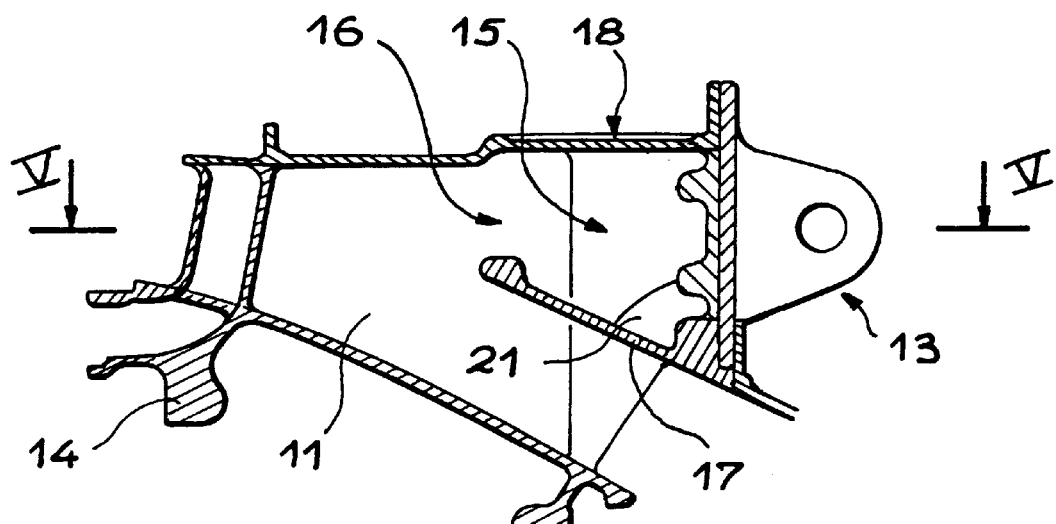
Figure 5:
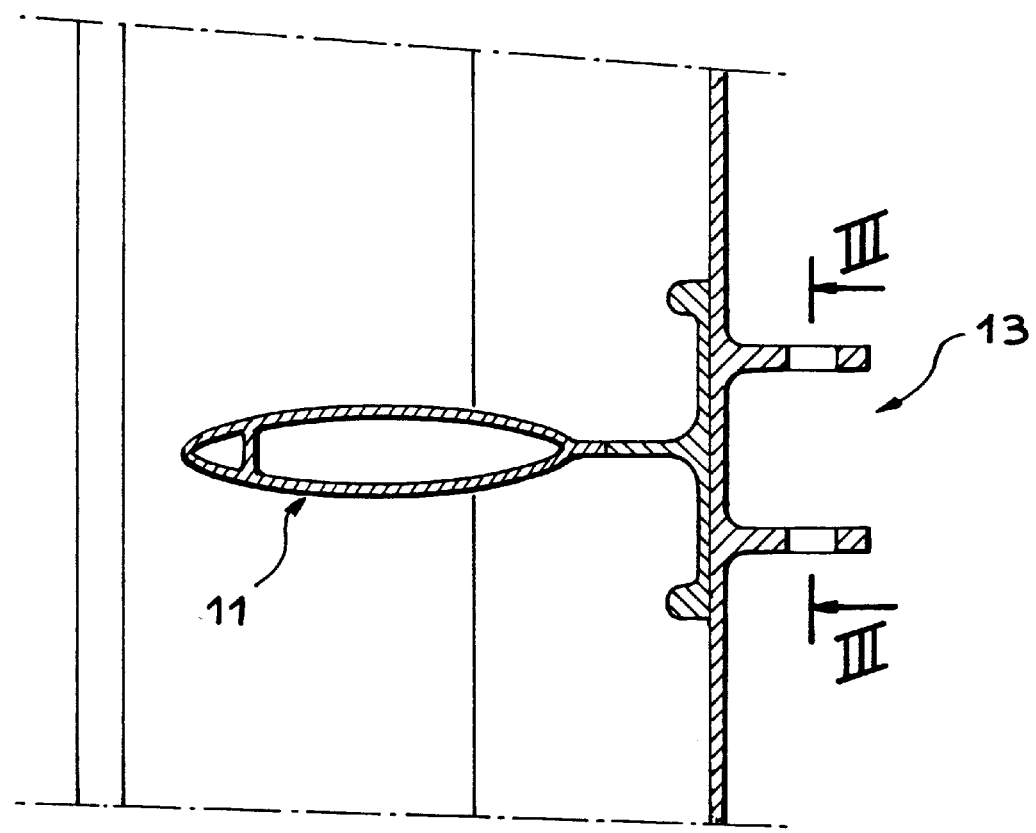

FIG. 1 is an overall view of the front of a turbo-prop engine and the invention, FIG. 2 is a general view of the invention, and FIGS. 3, 4 and 5 illustrate part of the trap according to the invention as seen from behind, the side and the outside according to sections III—III, IV—IV and V—V in FIGS. 5, 3 and 4 respectively.

The entry cone to an aircraft turbopropeller is drawn more precisely in FIG. 1; this cone comprises a reduction gear housing 1 on which various equipment is fitted, and a rotor supporting the end of the propeller shaft 2 that drives the propeller 3 and the front cone 4.

The entry cone also comprises a skin 5 that prolongs the cone 4 at the back and on the inside forms the boundary to a primary annular flow stream 6 through which air accelerated by the blades of the propeller 3 enters the engine and passes through the compressors and the turbines (not shown). The primary stream 6 is surrounded by a leading edge 7 that directs the air flow.

The housing 1 is suspended from the aircraft structure 9 by three rods 10.

The three suspension arms 11 (also seen in FIGS. 2 and 4) are screwed onto end plate 12 facing devises 13 and rods 10, and extend forwards and towards the inside of the engine, in other words towards the axis of rotation of shaft 2, as far as the reduction housing 1 to which they are screwed by flanges 14.

The particle trap 15 is in the shape of an annular chamber; it is delimited at the back by end plate 12, at the front by an entry 16 extending the primary stream 6, on the inside by separation leading edge 17 that separates it from a convergent portion of the primary stream 8 leading to the compressors and at the outside by a skin 18. The particle trap 15 operates like other particle traps, in other words it receives particles of all types accidentally drawn in by the engine and projected into it by inertia thus leaving the air flow, which continues along the primary stream 6. However, it can be seen that part of the suspension arms 11 divides this flow; as can be seen even better in FIG. 2, there is a suspension arm 11 at the top and two others extend towards the side, above the horizontal, such that the annular chamber in trap 15 is divided into two lateral angular sectors and one lower angular sector. The housing of the reduction gear 1 is suspended from the structure 9 by prolonging the rods 10 and the suspension arms 11.

The presence of the suspension arms 11 does not hinder the entry of particles, but maintenance of the engine makes it necessary to empty the trap 15. This is why the outside partition 18 for doors 19 is drilled, one on each sector of the chamber; two of these doors open towards side sectors and extend immediately above the side suspension arms 11 and the third door 19 opening at the bottom of the external partition 18 provides access to the lower sector; the contents of the trap 15 drop outside as soon as the doors 19 are opened.

But since it may be useful to encourage at least partial accumulation of particles at the bottom of trap in area 20, despite the suspension arms 11, they do not completely divide the annular chamber of the trap 15, but they are provided with a drilling at the bottom of the region in which they extend into trap 15 to allow at least the finest collected particles to drop into the lower sector of the chamber. One of these drillings is marked as reference 21 in FIGS. 1 and 4.

As in the described embodiment, if there is an arm 11 as far as the top of the trap 15, it would be advantageous if it is drilled in the same way as the others so that particles cannot accumulate on it, in order to prevent the need to handle two different models.

What is claimed is:

1. A particle trap (15) integrated in a turbo-prop engine intake housing, the housing being suspended from a surrounding structure (9) by suspension devices (10) supporting a rotor (2) through a reduction gear, the trap being in the form of an annular chamber opening forwards onto an air flow stream (6) that changes direction in front of the trap (15), characterized in that it is delimited towards the back by a circular end plate (12) supporting means (13) connecting the suspension devices (10), in that the chamber is divided by suspension arms (11) that project forwards and towards an axis of the rotor (2) from the end plate (12) facing the connection means and suspension devices, as far as a reduction housing (1) supporting the rotor (2), and which is delimited on the outside by a skin (18) in which doors (19) are formed immediately above the suspension arms (11), and in a lower part.

2. A particle trap according to claim 1, characterized in that the suspension arms (11) prolong the suspension devices (10).

3. A particle trap according to claim 1, characterized in that only some of the suspension arms (11) are drilled (21) in a lower part of the chamber.

4. A particle trap according to claim 3, characterized in that the suspension arms (11) prolong the suspension devices (10).

* * * * *